United States Patent
Kozaki

(10) Patent No.: US 9,889,488 B2
(45) Date of Patent: Feb. 13, 2018

(54) PEENING DEVICE AND PEENING METHOD

(71) Applicant: MITSUBISHI HEAVY INDUSTRIES, LTD., Minato-ku, Tokkyo (JP)

(72) Inventor: Takashi Kozaki, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 292 days.

(21) Appl. No.: 14/433,552

(22) PCT Filed: Oct. 9, 2013

(86) PCT No.: PCT/JP2013/077437
§ 371 (c)(1),
(2) Date: Apr. 3, 2015

(87) PCT Pub. No.: WO2014/057961
PCT Pub. Date: Apr. 17, 2014

(65) Prior Publication Data
US 2015/0258596 A1  Sep. 17, 2015

(30) Foreign Application Priority Data

Oct. 10, 2012  (JP) .................................. 2012-225321

(51) Int. Cl.
  *B21D 31/06*  (2006.01)
  *B24B 39/00*  (2006.01)
  (Continued)

(52) U.S. Cl.
  CPC .............. *B21D 31/06* (2013.01); *B23K 31/00* (2013.01); *B24B 39/006* (2013.01); *C21D 7/04* (2013.01);
  (Continued)

(58) Field of Classification Search
  CPC ... C21D 7/08; C21D 7/04; C21D 7/02; B21D 31/06; B24B 39/006; B24B 35/00; B21J 7/46; B24C 1/10
  (Continued)

(56) References Cited

U.S. PATENT DOCUMENTS 6,477,445 B1 * 11/2002 Ramstrom ........... G05B 19/423
                                                318/561
8,224,492 B2 *  7/2012 Lakomiak ............. G01H 1/003
                                                340/683
(Continued)

FOREIGN PATENT DOCUMENTS

JP   H04-146043 A   5/1992
JP   2006-95598 A   4/2006
(Continued)

OTHER PUBLICATIONS

Machine translation of JP 2006-095598.*
(Continued)

*Primary Examiner* — R. K. Arundale
*Assistant Examiner* — Mohammad Yusuf
(74) *Attorney, Agent, or Firm* — Manabu Kanesaka; Benjamin Hauptman; Kenneth Berner

(57) ABSTRACT

A peening device is provided with: peening impact pins that impact on a surface to be worked; a device main body that uses vibration to move the peening impact pins back and forth with respect to the surface to be worked; servo motors (22x, 22y) that adjust the inclination of the device main body with respect to the surface to be worked; laser displacement gauges (20A, 20B, 20C, 20D) that detect the device angle; and a vibration sensor (18) that detects the vibration state of the device main body. Furthermore, a control device (40) for the peening device controls the servo motors (22x, 22y) such that the vibration state detected by the vibration sensor (18)

(Continued)

is a predetermined vibration state. Thus, the peening device carries out excellent peening by conforming to the surface to be worked, the shape of which changes from moment to moment because of the peening.

6 Claims, 14 Drawing Sheets

(51) Int. Cl.
*C21D 7/04* (2006.01)
*C21D 7/08* (2006.01)
*C21D 7/06* (2006.01)
*C21D 11/00* (2006.01)
*B23K 31/00* (2006.01)
*C22C 21/00* (2006.01)
*C22F 3/00* (2006.01)

(52) U.S. Cl.
CPC ............... *C21D 7/06* (2013.01); *C21D 7/08* (2013.01); *C21D 11/00* (2013.01); *C22C 21/00* (2013.01); *C22F 3/00* (2013.01); *C21D 2221/00* (2013.01)

(58) Field of Classification Search
USPC .......................................................... 72/710
See application file for complete search history.

(56) References Cited

U.S. PATENT DOCUMENTS

| 2010/0024218 | A1 | 2/2010 | Pyun et al. |
| 2011/0123820 | A1* | 5/2011 | Shimanuki ............... C21D 7/04 |
| | | | 428/594 |
| 2014/0007394 | A1* | 1/2014 | Haas ..................... B24B 39/006 |
| | | | 29/90.01 |

FOREIGN PATENT DOCUMENTS

| JP | 2006-346775 A | 12/2006 |
| JP | 2010-299897 A | 2/2010 |
| JP | 4952856 B1 | 3/2012 |
| WO | 2009/139516 A1 | 11/2009 |

OTHER PUBLICATIONS

PCT/ISA/210, "International Search Report for PCT/JP2013/077437".
PCT/ISA/237, "Written Opinion of the International Searching Authority for PCT/JP2013/077437".
Europe Patent Office, "Search Report for EP 13844919.4," dated Oct. 2, 2015.

* cited by examiner

PEENING DEVICE AND PEENING METHOD

RELATED APPLICATIONS

The present application is National Phase of International Application No. PCT/JP2013/077437 filed Oct. 9, 2013, and claims priority from Japanese Application No. 2012-225321, filed Oct. 10, 2012, the disclosure of which is hereby incorporated by reference herein in its entirety.

TECHNICAL FIELD

The present invention relates to a peening device and a peening method.

BACKGROUND ART

In a peening device, for example, pins which are impact means are moved back and forth by an ultrasonic vibration to impact on a surface to be worked of a workpiece (sheet metal or the like), compressive residual stress is generated on the surface to be worked, and thus, improvement in bending forming (peen forming) of the workpiece, or improvement in fatigue characteristics of the workpiece or a welding portion thereof is achieved.

When the peening device is manually operated and peening is performed on the surface to be worked, a worker directly receives the vibration due to a back and forth motion of pins. Accordingly, in the peening device in the related art, there is a problem that stability of peening processing deteriorates due to vibration or there is problem that variation arises in an impact angle caused by a worker.

In order to solve the above-described problems, in PTL 1, a structure is disclosed in which a peening device main body is held to be perpendicular to a surface to be worked, and vibration is absorbed by a spring.

In addition, in PTL 2, a device is disclosed in which a peening device main body is held by a holding mechanism such as a robot, the holding mechanism such as a robot and a surface to be worked are positioned to be perpendicular to each other, and the surface to be worked is automatically impacted while being pressed to a welding bead portion.

CITATION LIST

Patent Literature

[PTL 1] Japanese Patent No. 4952856
[PTL 2] Japanese Unexamined Patent Application Publication No. 2010-29897

SUMMARY OF INVENTION

Technical Problem

However, when a workpiece having a surface to be worked is thin or the like, the workpiece itself is influenced by peening and is vibrated, and thus, it is difficult to cause a holding mechanism or the like such as a robot to come into contact with a surface to be worked to achieve a perpendicular reference surface.

In addition, when bending forming is performed, if the workpiece is thin, the shape of the surface to be worked changes from moment to moment because of the peening, and thus, even when the peening device main body and the surface to be worked are positioned in advance before the peening is performed, it is not easy to maintain the peening device main body and the surface to be worked so as to be perpendicular to each other. In addition, since it is not easy to predict a process of the change in shape of the surface to be worked, it is not possible to perform advanced teaching with respect to the holding mechanism such as the robot to match the change in shape.

The present invention is made in consideration of the above-described circumstances, and an object thereof is provided a peening device and a peening method capable of performing excellent peening by conforming to the surface to be worked, the shape of which changes from moment to moment because of the peening.

Solution to Problem

In order to solve the above-described problems, a peening device and a peening method of the present invention adopt the following means.

According to a first aspect of the present invention, there is provided a peening device including: impact means for impacting on a surface to be worked; a device main body that moves the impact means back and forth with respect to the surface to be worked; inclination adjustment means for adjusting an inclination of the device main body with respect to the surface to be worked; vibration detection means for detecting a vibration state of the device main body; and control means for controlling the inclination adjustment means such that the vibration state detected by the vibration detection means is a predetermined vibration state.

In the peening device according to this configuration, the impact means included in the device main body moves back and forth with respect to the surface to be worked, and impacts on the surface to be worked.

The shape of the surface to be worked is changed from moment to moment because of peening, and thus, an angle between the surface to be worked and the device main body including the impact means is changed, and the vibration state of the device main body is changed. Accordingly, in a peening device, it is not always possible to carry out excellent peening with respect to the surface to be worked.

Therefore, according to the present configuration, the vibration state of the device main body is detected by the vibration detection means, and the inclination adjustment means for adjusting the inclination of the device main body with respect to the surface to be worked is controlled by the control means such that the detected vibration state is the predetermined vibration state. In addition, the predetermined vibration state indicates a vibration state when excellent peening is performed.

In this way, since the inclination adjustment means adjusts the inclination of the device main body with respect to the surface to be worked such that the vibration state of the device main body is an excellent vibration state, according to the present configuration, it is possible to carry out excellent peening by conforming to the surface to be worked, the shape of which changes from moment to moment because of the peening.

In the first aspect, the inclination adjustment means may be a motor that rotates the device main body around a predetermined axis, and the control means may calculate an angle between the device main body and the surface to be worked based on a rotation angle of the motor, and may determine an operation amount with respect to the inclination adjustment means based on a difference between the calculated angle and a predetermined angle, and a difference between the vibration state detected by the vibration detection means and the predetermined vibration state.

According to this configuration, through the inclination adjustment means, the angle between the device main body and the surface to be worked becomes an angle suitable for the peening, and the inclination of the device main body with respect to the surface to be worked is adjusted such that the vibration state of the device main body is an excellent vibration state. Accordingly, it is possible to carry out a greater quantity of excellent peening by conforming to the surface to be worked, the shape of which changes from moment to moment because of the peening.

According to a second aspect of the present invention, there is provided a peening device including: impact means for impacting on a surface to be worked; a device main body that uses vibration to move the impact means back and forth with respect to the surface to be worked; inclination adjustment means for adjusting an inclination of the device main body with respect to the surface to be worked; angle detection means for detecting an angle between the device main body and the surface to be worked; and control means for controlling the inclination adjustment means such that the angle detected by the angle detection means is a predetermined angle.

According to this configuration, the angle between the device main body and the surface to be worked is detected by the angle detection means, and the inclination adjustment means for adjusting the inclination of the device main body with respect to the surface to be worked is controlled by the control means such that the detected angle is the predetermined angle. In addition, for example, the predetermined angle is 90°.

In this way, the inclination of the device main body with respect to the surface to be worked is adjusted by the inclination adjustment means such that the angle between the device main body and the surface to be worked becomes an angle suitable for the peening, and thus, according to the present configuration, it is possible to carry out a greater quantity of excellent peening by conforming to the surface to be worked, the shape of which changes from moment to moment because of the peening.

In the second aspect, the vibration detection means for detecting a vibration state of the device main body may be further provided, and the control means may determine an operation amount with respect to the inclination adjustment means based on a difference between the angle detected by the angle detection means and the predetermined angle, and a difference between the vibration state detected by the vibration detection means and a predetermined vibration state.

According to this configuration, through the inclination adjustment means, the angle between the device main body and the surface to be worked becomes an angle suitable for the peening, and the inclination of the device main body with respect to the surface to be worked is adjusted such that the vibration state of the device main body is an excellent vibration state. Accordingly, it is possible to carry out a greater quantity of excellent peening by conforming to the surface to be worked, the shape of which changes from moment to moment because of the peening.

In the second aspect, the angle detection means may detect a distance between the device main body and the surface to be worked at a plurality of locations, and may detect the angle between the device main body and the surface to be worked.

According to this configuration, even when the shape of the surface to be worked is changed from moment to moment because of the peening, it is possible accurately detect the angle between the device main body and the surface to be worked.

In the first aspect or the second aspect, when the vibration in the state detected by the vibration detection means is greater than in the predetermined vibration state, the predetermined vibration state may be updated to the detected vibration state.

According to this configuration, since there may be a state of greater vibration, it is possible to perform a greater quantity of excellent peening.

According to a third aspect of the present invention, there is provided a peening method of a peening device which includes impact means for impacting on a surface to be worked, a device main body that moves the impact means back and forth with respect to the surface to be worked, inclination adjustment means for adjusting an inclination of the device main body with respect to the surface to be worked, and vibration detection means for detecting a vibration state of the device main body, including: a first step of detecting the vibration state of the device main body by the vibration detection means; and a second step of controlling the inclination adjustment means such that the detected vibration state is a predetermined vibration state.

According to a fourth aspect of the present invention, there is provided a peening method of a peening device which includes impact means for impacting on a surface to be worked, a device main body that uses vibration to move the impact means back and forth with respect to the surface to be worked, inclination adjustment means for adjusting an inclination of the device main body with respect to the surface to be worked, and angle detection means for detecting an angle between the device main body and the surface to be worked, including: a first step of detecting the angle between the device main body and the surface to be worked by the angle detection means; and a second step of controlling the inclination adjustment means such that the detected angle is a predetermined angle.

In the fourth aspect, the peening device may further include vibration detection means for detecting a vibration state of the device main body, and in the first step, the angle between the device main body and the surface to be worked may be detected by the angle detection means, and the vibration state of the device main body may be detected by the vibration detection means, and in the second step, an operation amount with respect to the inclination adjustment means may be determined based on a difference between the detected angle and a predetermined angle and a difference between the detected vibration state and a predetermined vibration state.

Advantageous Effects of Invention

According to the present invention, it is possible to perform excellent peening by conforming to the surface to be worked, the shape of which changes from moment to moment because of the peening.

DESCRIPTION OF EMBODIMENTS

Hereinafter, embodiments of a peening device and a peening method according to the present invention will be described with reference to the drawings.

First Embodiment

Hereinafter, a first embodiment of the present invention will be described.

Figure 1:
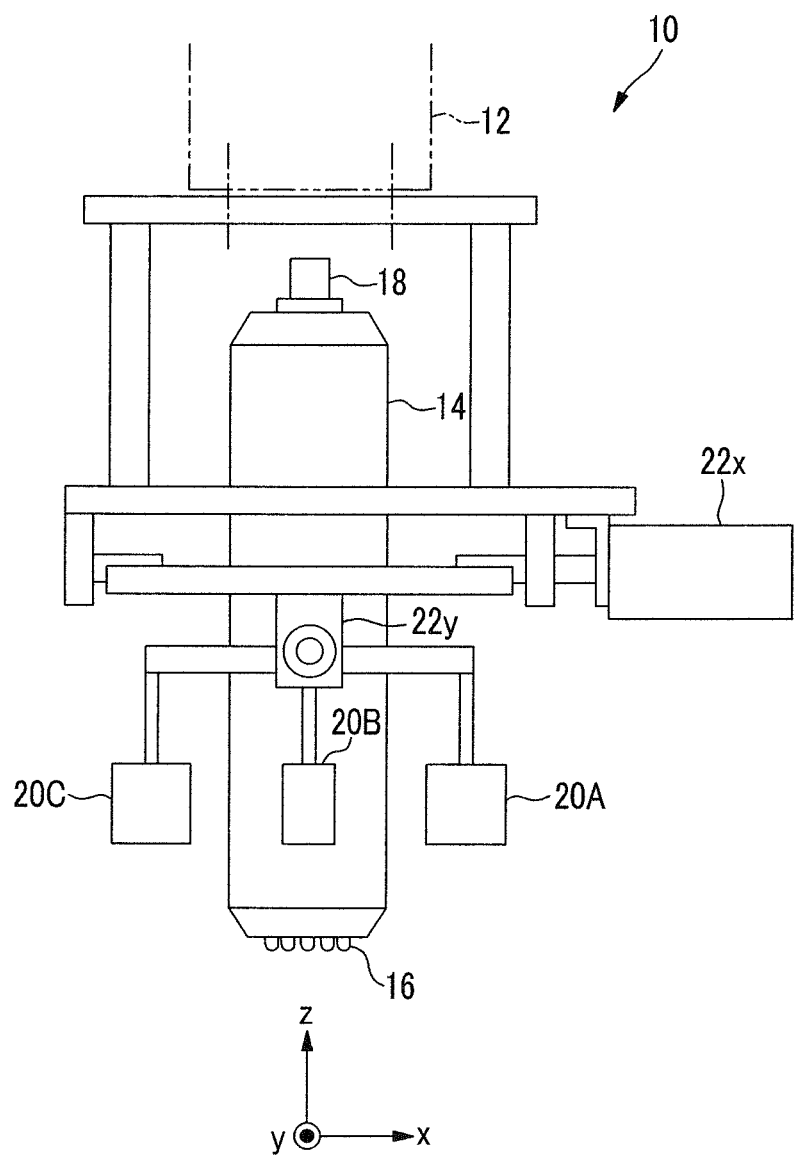
FIG. 1 is an outline view of a peening device according to a first embodiment of the present invention.
Figure 2:
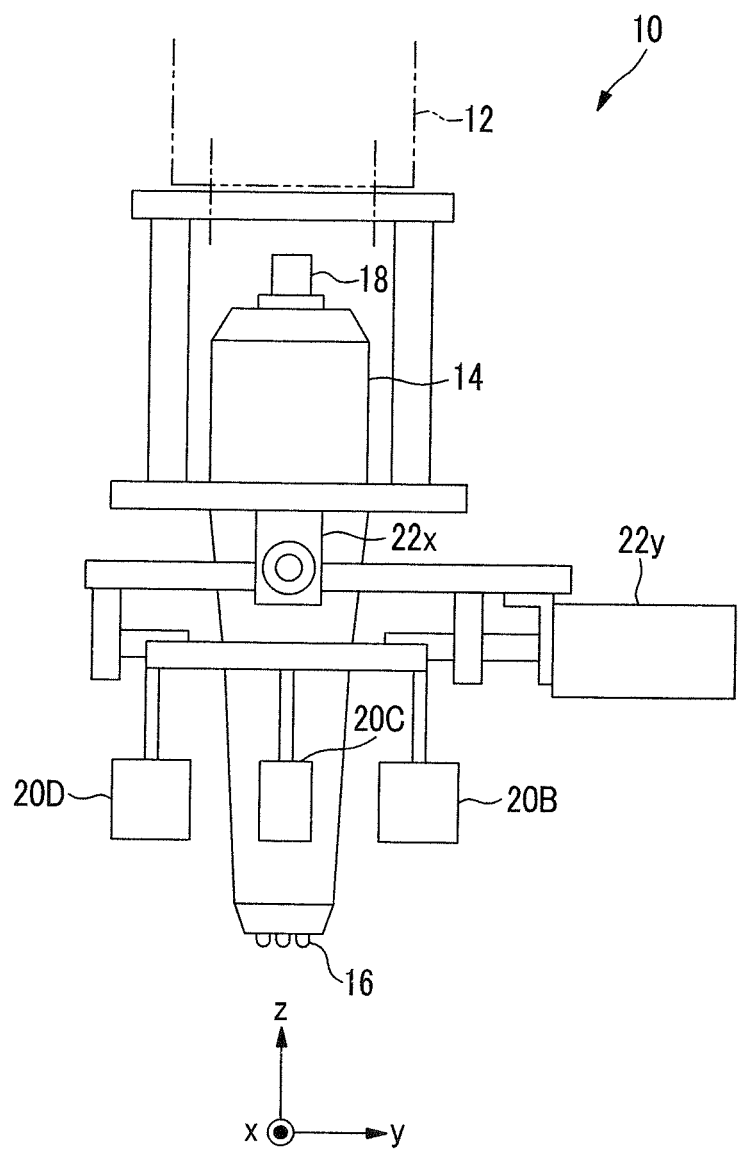
FIG. 2 is an outline view of the peening device according to the first embodiment of the present invention.

FIGS. 1 and 2 are outline views of a peening device according to the first embodiment. In FIG. 1, a direction perpendicular to a paper surface is defined as a y axis, a right-left direction is defined as an x axis, and an up-down direction is defined as a z axis, and in FIG. 2, a direction perpendicular to a paper surface is defined as an x axis, a right-left direction is defined as a y axis, and an up-down direction is defined as a z axis.

The peening device 10 is connected to a feeding device 12 such as a robot or a balancer, automatically moves to impact on a surface to be worked of a workpiece, and decreases residual stress generated by bending forming or welding, or the like. For example, the workpiece is a metal such as aluminum or aluminum alloy.

Moreover, the peening device 10 may not be connected to the feeding device 12, and may be held by a worker and be moved by the worker.

Peening impact pins 16 that impact on the surface to be worked are provided on a lower portion of a device main body 14 of the peening device 10, that is, a portion opposing the surface to be worked. The device main body 14 moves the peening impact pins 16 back and forth with respect to the surface to be worked by vibration (for example, ultrasonic vibration of approximately 20 kHz or more). In addition, the shape or the back and forth method of the peening impact pin 16 is not limited.

A vibration sensor 18 that detects a vibration state of the device main body 14 is provided on the upper portion of the device main body 14. As the vibration sensor 18, a sensor that detects an acceleration of the device main body 14 is used. In addition, the position of the vibration sensor 18 is an example, and the vibration sensor 18 may be provided at other positions in the device main body 14.

A plurality of laser displacement gauges 20 (20A, 20B, 20C, and 20D) are provided on a side surface of the device main body 14. As an example, in the laser displacement gauges 20, about the z axis of the device main body 14, two laser displacement gauges are provided at positions that face each other on the x axis, and two laser displacement gauges are provided at positions that face each other on the y axis.

The laser displacement gauge 20 functions as angle detection means for detecting an angle (hereinafter, referred to as a "device angle") between the device main body 14 and the surface to be worked. That is, the laser displacement gauges 20 detect a distance between the device main body 14 and the surface to be worked at a plurality of locations, and thus, detect the angle between the device main body 14 and the surface to be worked, which is perpendicular to the z axis direction.

In addition, as inclination adjustment means for adjusting an inclination of the device main body 14 with respect to the surface to be worked, the device main body includes a servo motor 22x with the x axis as a rotational axis and a servo motor 22y with the y axis as a rotational axis.

Here, the shape of the surface to be worked is changed from moment to moment because of the peening, and thus, the device angle is changed, and the vibration state of the device main body 14 is changed. Accordingly, in the peening device in the related art, it is not always possible to carry out excellent (large vibration) peening with respect to the surface to be worked.

Therefore, in the peening device 10 according to the first embodiment, in order always to allow excellent peening to be carried out with respect to the surface to be worked, the vibration sensor 18, the laser displacement gauges 20A, 20B, 20C, and 20D, and the servo motors 22x and 22y configure an attitude control device 30 of the peening device 10.

Figure 3:
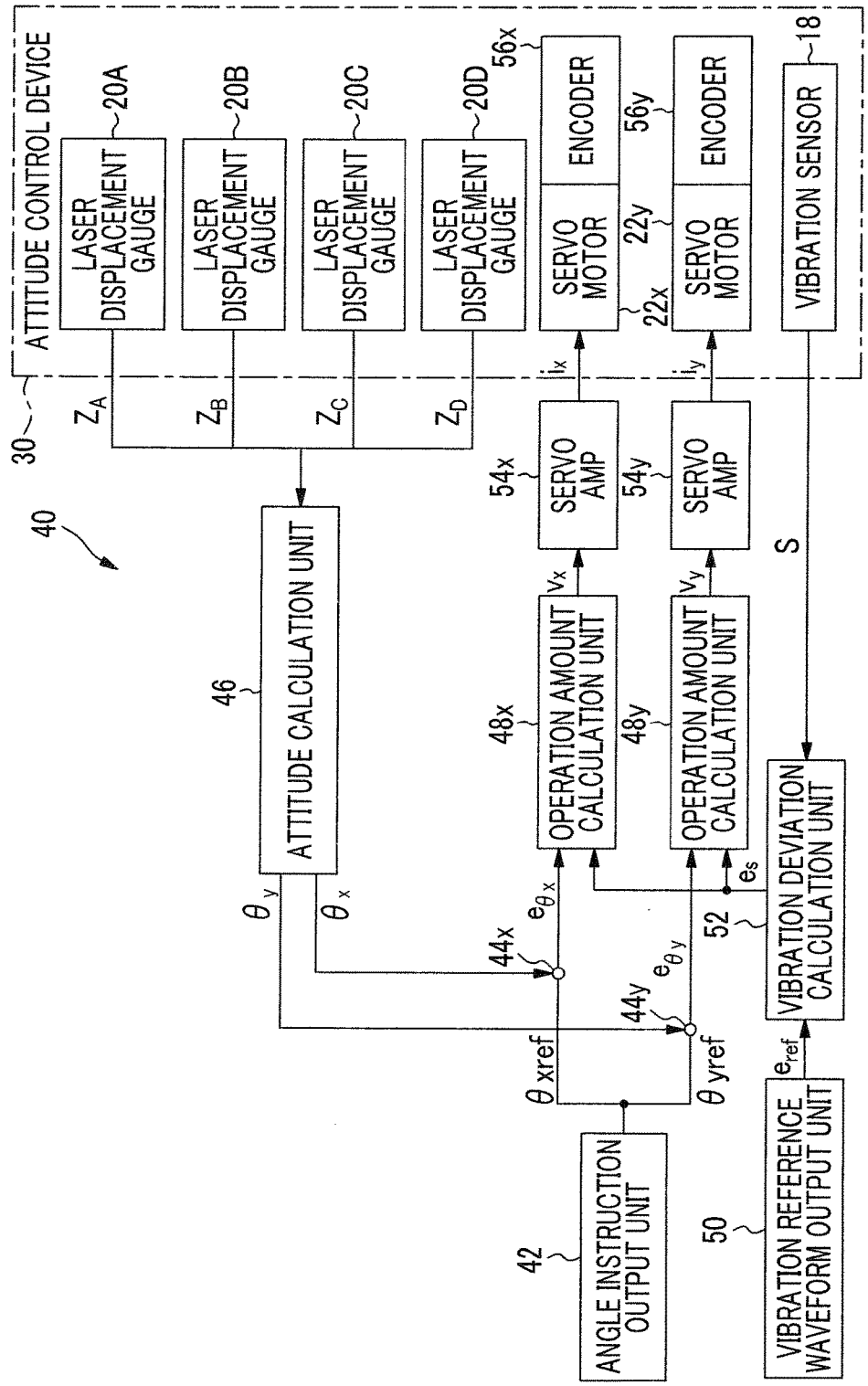
FIG. 3 is a block diagram showing an electrical configuration of a control device of the peening device according to the first embodiment of the present invention.

FIG. 3 is a block diagram showing an electrical configuration of a control device 40 of the peening device 10 according to the first embodiment, and particularly, shows the electrical configuration with respect to an attitude control of the device main body 14.

In addition, for example, the control device 40 is mainly configured of a Central Processing Unit (CPU), a Random Access Memory (RAM), a computer readable recording medium, or the like. In addition, as an example, a processing sequence for realizing various functions of an angle instruction output unit 42, calculation units 44x and 44y, an attitude calculation unit 46, operation amount calculation units 48x and 48y, a vibration reference waveform output unit 50, and a vibration deviation calculation unit 52 described below is recorded on a recording medium or the like in the form of a program, the CPU reads out the program from the RAM or the like, and the various functions are realized by carrying out processing and calculation processing of information.

The angle instruction output unit 42 outputs a command value (hereinafter, referred to as an "angle command value") of a predetermined device angle. In addition, the angle instruction output unit 42 outputs an angle command value $\theta_{xref}$ in the x direction to the calculation unit 44x, and outputs an angle command value $\theta_{yref}$ in the y direction to the calculation unit 44y.

In addition, for example, each of the angle command values $\theta_{xref}$ and $\theta_{yref}$ is 90°.

Displacement sensor signals $Z_A$, $Z_B$, $Z_C$, and $Z_D$ which are distances detected by the laser displacement gauges 20A, 20B, 20C, and 20D are input to the attitude calculation unit 46, and the attitude calculation unit calculates the device angle $\theta_x$ in the x direction and the device angle $\theta_y$ in the y direction based on the displacement sensor signals $Z_A$, $Z_B$, $Z_C$, and $Z_D$. Moreover, the attitude calculation unit 46 outputs the device angle $\theta_x$ to the calculation unit 44x, and outputs the device angle $\theta_y$ to the calculation unit 44y.

The calculation unit 44x calculates a deviation (hereinafter, referred to as "angle deviation $e_{\theta x}$ in the x direction") between the input device angle $\theta_x$ and the angle command value $\theta_{xref}$ and outputs the deviation to the operation amount calculation unit 48x.

The calculation unit 44y calculates a deviation (hereinafter, referred to as "angle deviation $e_{\theta y}$ in the y direction") between the input device angle $\theta_y$ and the angle command value $\theta_{yref}$, and outputs the deviation to the operation amount calculation unit 48y.

The vibration reference waveform output unit 50 stores a reference waveform in the vibration state of the device main body 14 and outputs the reference waveform.

Figure 4:
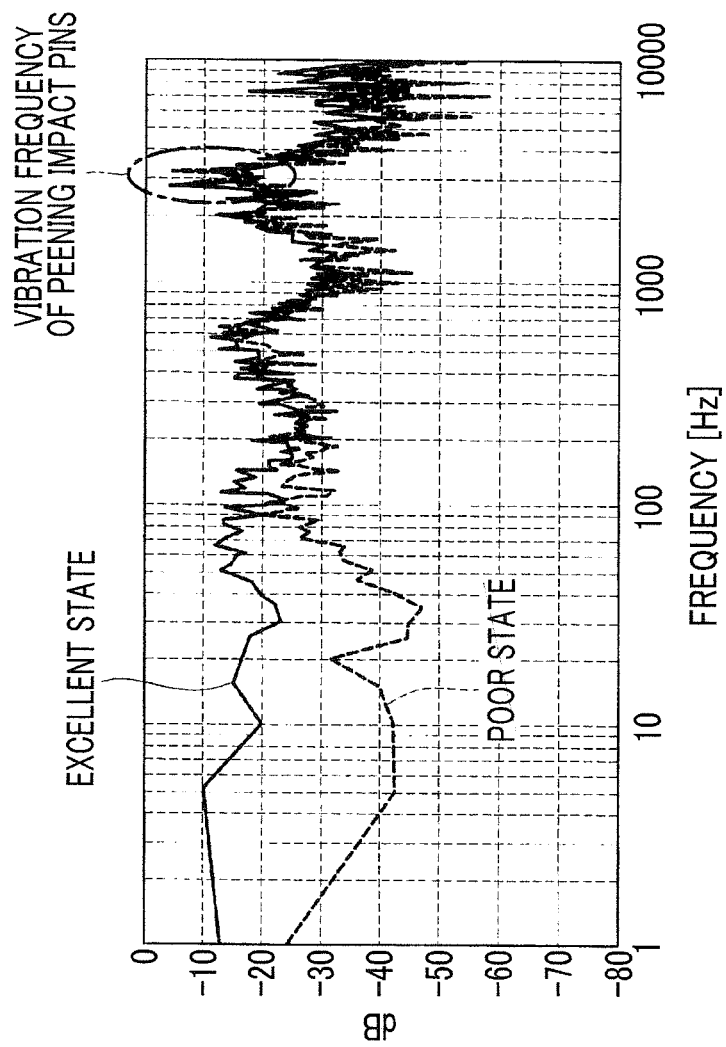
FIG. 4 is a graph showing a vibration state of the peening device according to the first embodiment of the present invention.

FIG. 4 is an example of a graph showing the vibration state of the peening device 10. At a frequency lower than the vibration frequency of the peening impact pins 16 and at a frequency less than or equal to 200 Hz, the vibration states are different from each other with a state where the vibration is excellent and a state where the vibration is poor. As shown in FIG. 4, the vibration of the excellent vibration state is greater than that of the poor vibration state.

The vibration reference waveform output unit 50 outputs the waveform of the excellent vibration state shown in the example of FIG. 4 to the vibration deviation calculation unit 52, as a reference waveform $e_{ref}$ which is predetermined.

The vibration deviation calculation unit 52 calculates a deviation (hereinafter, referred to as "vibration deviation $e_s$") between a vibration sensor signal S output from the vibration sensor 18 and the reference waveform $e_{ref}$, and outputs the deviation to the operation amount calculation units 48x and 48y.

Moreover, the vibration deviation calculation unit calculates the vibration deviation $e_s$ at a frequency less than or equal to 200 Hz, preferably, the vibration deviation $e_s$ at a frequency less than or equal to 100 Hz, as shown in the example of FIG. 4, using a low pass filter.

The operation amount calculation unit 48x calculates an operation amount command value $V_x$ indicating the operation amount with respect to the servo motor 22x based on the input angle deviation $e_{\theta x}$ in the x direction and the vibration deviation $e_s$, and outputs the operation amount command value to the servo amp 54x. Moreover, for example, the operation amount calculation unit 48x may calculate the operation amount command value $V_x$ by a predetermined function, and may calculate the operation amount command value $V_x$ by table information indicating a relationship between the angle deviation $e_{\theta x}$ in the x direction, the vibration deviation $e_s$, and the operation amount command value $V_x$.

The operation amount calculation unit 48y calculates an operation amount command value $V_y$ indicating the operation amount with respect to the servo motor 22y based on the input angle deviation $e_{\theta y}$ in the y direction and the vibration deviation $e_s$, and outputs the operation amount command value to the servo amp 54y. Moreover, for example, the operation amount calculation unit 48y may calculate the operation amount command value $V_y$ by a predetermined function, and may calculate the operation amount command value $V_y$ by table information indicating a relationship between the angle deviation $e_{\theta y}$ in the y direction, the vibration deviation $e_s$, and the operation amount command value $V_y$.

Moreover, for example, the operation amount command values $V_x$ and $V_y$ are voltage values.

The servo amp 54x supplies a current $i_x$ for driving the servo motor 22x based on the input operation amount command value $V_x$ to the servo motor 22x.

The servo motor 22x rotates a rotary shaft according to the supplied current $i_x$. A rotational state of the rotary shaft is detected by an encoder 56x.

The servo amp 54y supplies a current $i_y$ for driving the servo motor 22y based on the input operation amount command value $V_y$ to the servo motor 22y.

The servo motor 22y rotates the rotary shaft according to the supplied current $i_y$. The rotational state of the rotary shaft is detected by an encoder 56y.

In this way, the detected device angles $\theta_x$ and $\theta_y$ and the detected vibration sensor signal S are fed back to the control device 40, and the control device 40 determines the operation amounts with respect to the servo motors 22x and 22y based on the differences between the device angles $\theta_x$ and $\theta_y$, and the determined angle command values $\theta_{xref}$ and $\theta_{yref}$, and the difference between the vibration sensor signal S and the predetermined reference waveform $e_{ref}$.

Accordingly, in the peening device 10 according to the first embodiment, the vibration state can easily be made to be the excellent vibration state of the device main body 14.

Figure 5:
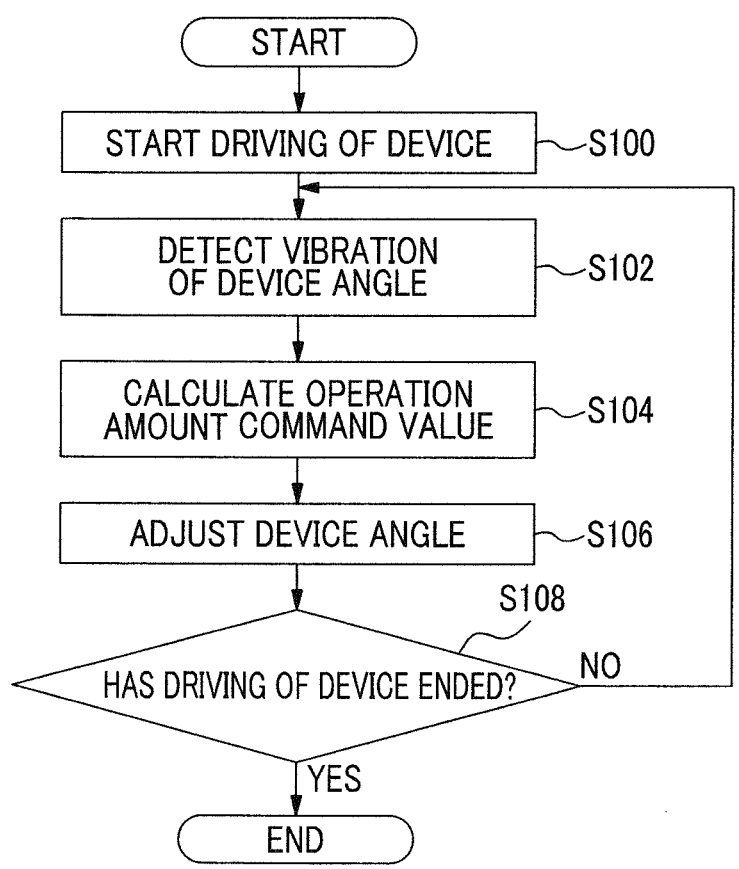
FIG. 5 is a flowchart showing a flow of peening processing according to the first embodiment of the present invention.

FIG. 5 is a flowchart showing a flow of peening processing using the peening device 10 according to the first embodiment.

First, in Step 100, driving of the peening device 10 starts. Accordingly, impact on the surface to be worked by the peening impact pin 16 starts.

Moreover, compared to a case where the peening device does not include the attitude control device 30, a pressure force on the surface to be worked by the peening device 10 is weak, and for example, is 5 kg to 10 kg. When the peening device 10 is connected to the feeding device 12, for example, the peening device 10 is biased by a spring provided between the feeding device 12 and the peening device 10, and thus, the pressure force on the surface to be worked is generated.

In the subsequent step 102, the attitude calculation unit 46 detects the device angles $\theta_x$ and $\theta_y$ based on the result detected by the laser displacement gauges 20A, 20B, 20C, and 20D, and the vibration sensor 18 detects the vibration of the device main body 14.

In the subsequent step 104, the operation amount calculation unit 48x calculates the operation amount command value $V_x$ using the feedback of the device angles $\theta_x$ and $\theta_y$ and the vibration sensor signals S, and the operation amount calculation unit 48y calculates the operation amount command value $V_y$.

Figure 6:
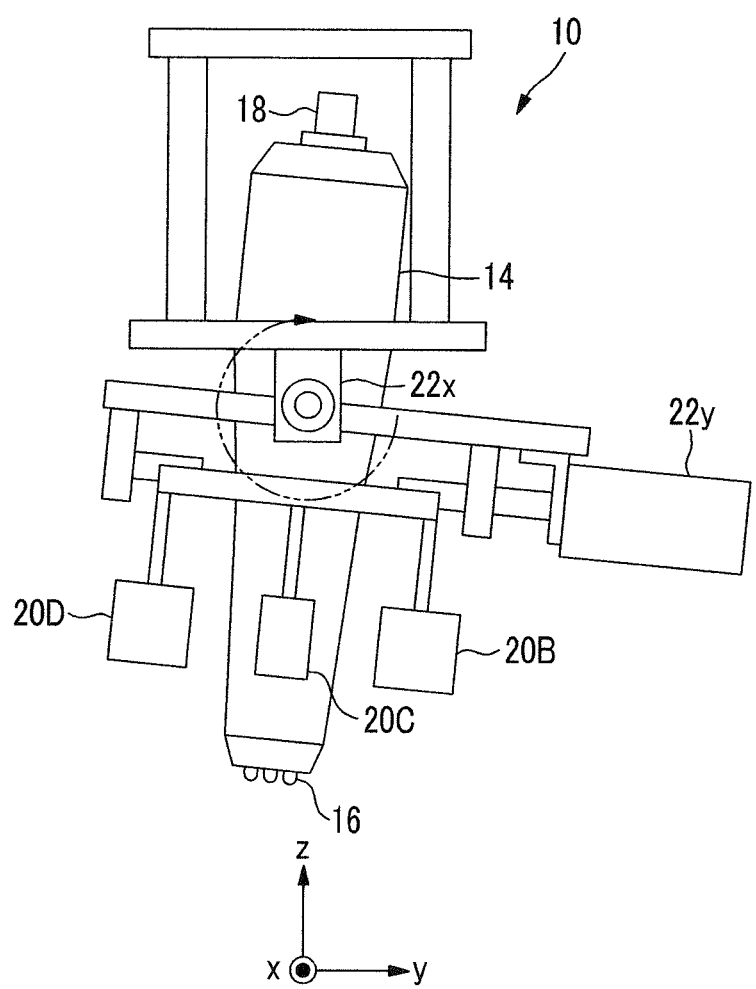
FIG. 6 is an outline view showing a state conforming to a surface to be worked of the peening device according to the first embodiment of the present invention.
Figure 7:
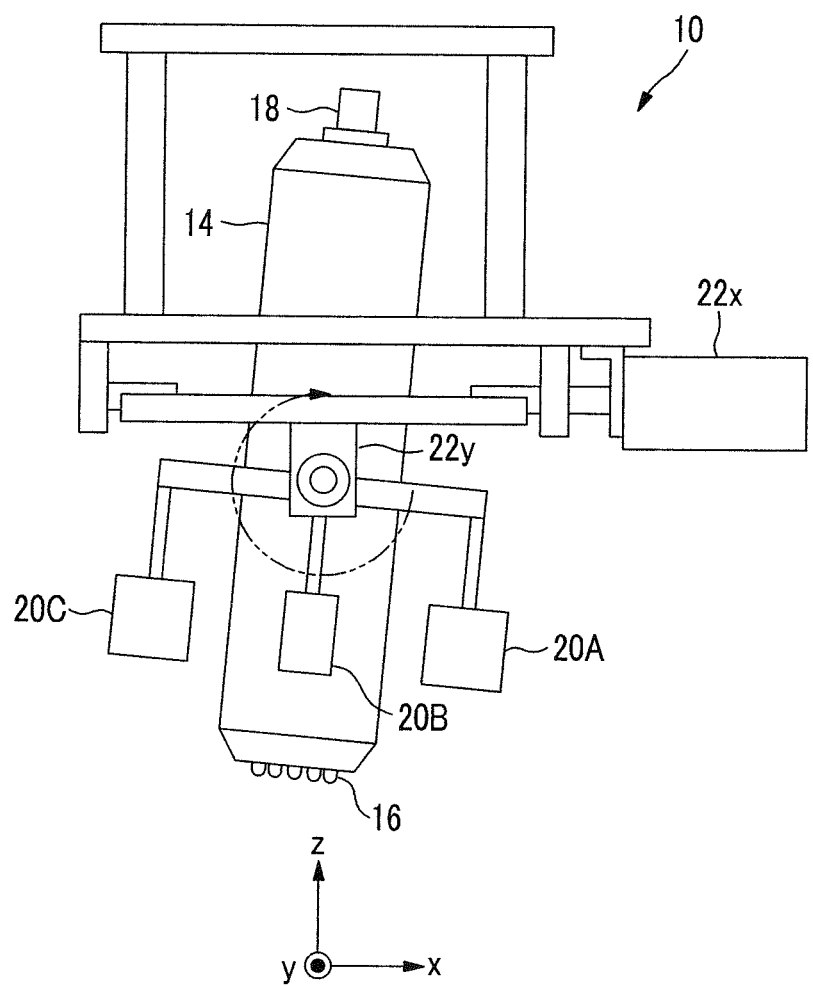
FIG. 7 is an outline view showing the state conforming to a surface to be worked of the peening device according to the first embodiment of the present invention.

In the subsequent step 106, the servo amp 54x supplies the current $I_x$ based on the operation amount command value $V_x$ to the servo motor 22x, and rotates the rotary shaft of the servo motor 22x around the x axis. Accordingly, as shown in FIG. 6, the device main body 14 is rotated around the x axis. In addition, the servo amp 54y supplies the current $I_y$ based on the operation amount command value $V_y$ to the servo motor 22y, and rotates the rotary shaft of the servo motor 22y around the y axis. Accordingly, as shown in FIG. 7, the device main body 14 is rotated around the y axis.

In this way, since the servo motors 22x and 22y adjust the inclination of the device main body 14 with respect to the surface to be worked so that the vibration state of the device main body 14 becomes the excellent vibration state indicated by the reference waveform $e_{ref}$, in the peening device 10 according to the first embodiment, it is possible to carry out excellent peening by conforming to the surface to be worked, the shape of which changes from moment to moment because of the peening.

In the subsequent step 108, it is determined whether or not stopping of the driving of the peening device 10 is instructed, when stopping is instructed, the peening processing ends, and when stopping is not instructed, processing or operation is transferred to Step S102, and thus, the peening with respect to the surface to be worked is continued.

As described above, the peening device 10 according to the first embodiment includes the peening impact pins 16 that impact on the surface to be worked, the device main body 14 that uses vibration to move the peening impact pins 16 back and forth with respect to the surface to be worked, the servo motors 22x and 22y that adjust the inclination of the device main body 14 with respect to the surface to be worked, the laser displacement gauges 20A, 20B, 20C, and 20D that detect the device angle, and the vibration sensor 18 that detects the vibration state of the device main body 14. In addition, the control device 40 of the peening device 10 controls the servo motors 22x and 22y such that the vibration state detected by the vibration sensor 18 is a predetermined vibration state.

Accordingly, in the peening device 10 of the first embodiment, it is possible to carry out excellent peening by conforming to the surface to be worked, the shape of which changes from moment to moment because of the peening.

Second Embodiment

Hereinafter, a second embodiment of the present invention will be described.

In addition, the configuration of the peening device 10 according to the second embodiment is similar to the configuration of the peening device 10 according to the first embodiment shown in FIG. 1, and descriptions thereof are omitted.

Figure 8:
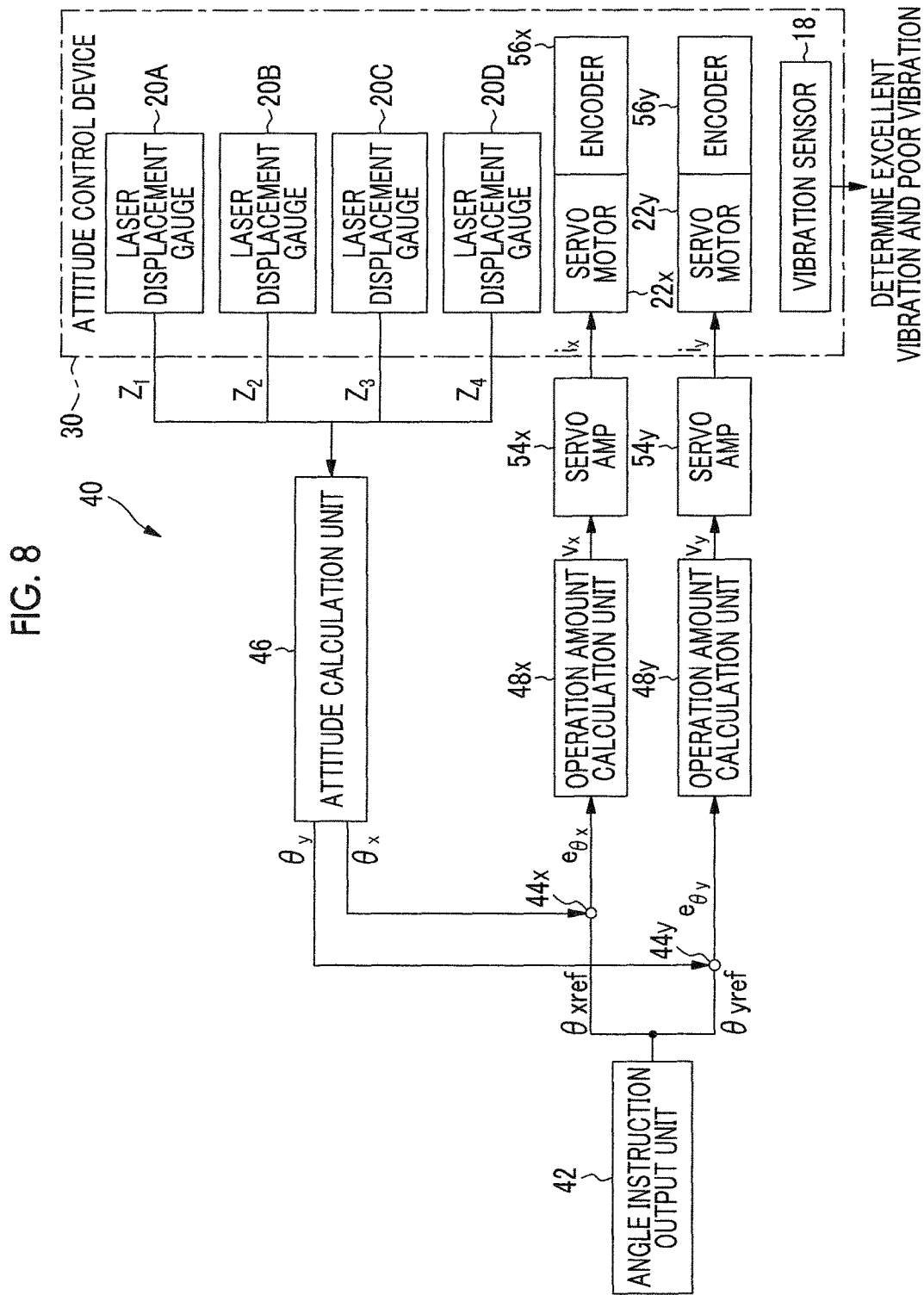
FIG. 8 is a block diagram showing an electrical configuration of a control device of a peening device according to a second embodiment of the present invention.

FIG. 8 is a block diagram showing the electrical configuration of the control device 40 of the peening device 10 according to the second embodiment, and particularly, shows the electrical configuration with respect to the attitude control. In addition, in FIG. 8, the same reference numerals as those of FIG. 3 are assigned to the same components as those of FIG. 3, and descriptions thereof are omitted.

As shown in FIG. 8, in the peening device 10 according to the second embodiment, the feedback based on the result detected by the vibration sensor 18 is not performed. That is, the control device 40 performs only feedback based on the result detected by the laser displacement gauges 20A, 20B, 20C, and 20D, and calculates the operation amount command values $V_x$ and $V_y$.

Moreover, the result detected by the vibration sensor 18 is separately monitored, and whether or not the vibration state of the device main body 14 is an excellent vibration state is determined by the worker or the like.

Figure 9:
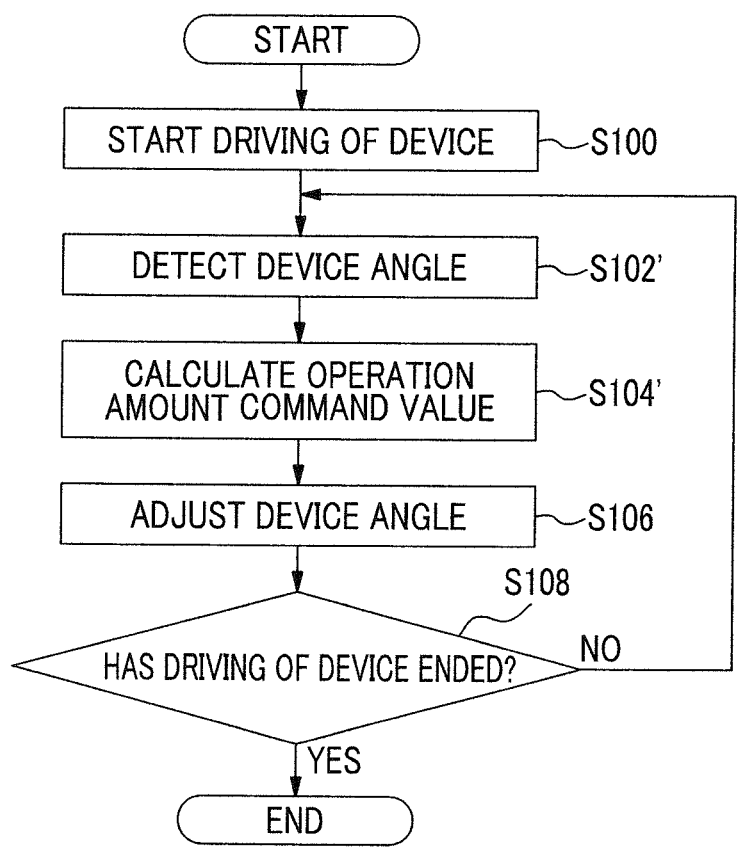
FIG. 9 is a flowchart showing a flow of peening processing according to the second embodiment of the present invention.

FIG. 9 is a flowchart showing a flow of peening processing according to the second embodiment. In addition, in FIG. 9, the same reference numerals as those of FIG. 5 are assigned to the same steps as those of FIG. 5, and a portion or the entirety of the descriptions thereof is omitted.

First, in Step 100, if the driving of the peening device 10 starts, processing or operation is transferred to Step 102'.

In Step 102', the attitude calculation unit 46 calculates the device angles $\theta_x$ and $\theta_y$, based on the result detected by the laser displacement gauges 20A, 20B, 20C, and 20D.

In the subsequent step 104', the operation amount calculation unit 48x calculates the operation amount command value $V_x$ using the feedback of the device angles $\theta_x$ and $\theta y$, the operation amount calculation unit 48y calculates the operation amount command value $V_y$, and processing or operation is transferred to Step 106.

In Step 106, the servo amp 54x supplies the current $I_x$ based on the operation amount command value $V_x$ to the servo motor 22x, and the servo amp 54y supplies the current $I_y$ based on the operation amount command value $V_y$ to the servo motor 22y.

In the subsequent step 108, it is determined whether or not stopping of the driving of the peening device 10 is instructed, when stopping is instructed, the peening processing ends, and when stopping is not instructed, processing or operation is transferred to Step S102', and thus, the peening with respect to the surface to be worked is continued.

As described above, the peening device 10 according to the second embodiment includes the peening impact pins 16 that impact on the surface to be worked, the device main body 14 that uses vibration to move the peening impact pins 16 back and forth with respect to the surface to be worked, the servo motors 22x and 22y that adjust the inclination of the device main body 14 with respect to the surface to be worked, and the laser displacement gauges 20A, 20B, 20C, and 20D that detect the device angle. In addition, the control device 40 of the peening device 10 controls the servo motors 22x and 22y such that the device angle detected by the laser displacement gauges 20A, 20B, 20C, and 20D is a predetermined device angle.

Accordingly, in the peening device 10 of the second embodiment, it is possible to carry out excellent peening by conforming to the surface to be worked, the shape of which changes from moment to moment because of the peening.

Third Embodiment

Hereinafter, a third embodiment of the present invention will be described.

Figure 10:
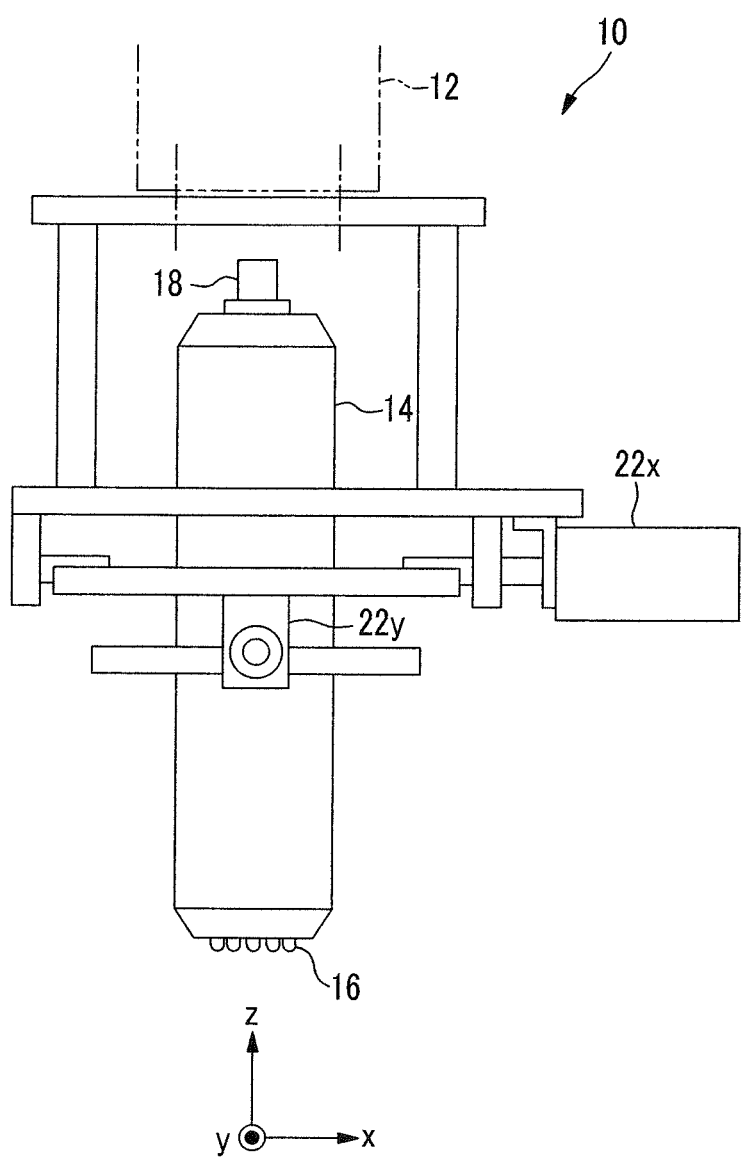
FIG. 10 is an outline view of a peening device according to a third embodiment of the present invention.
Figure 11:
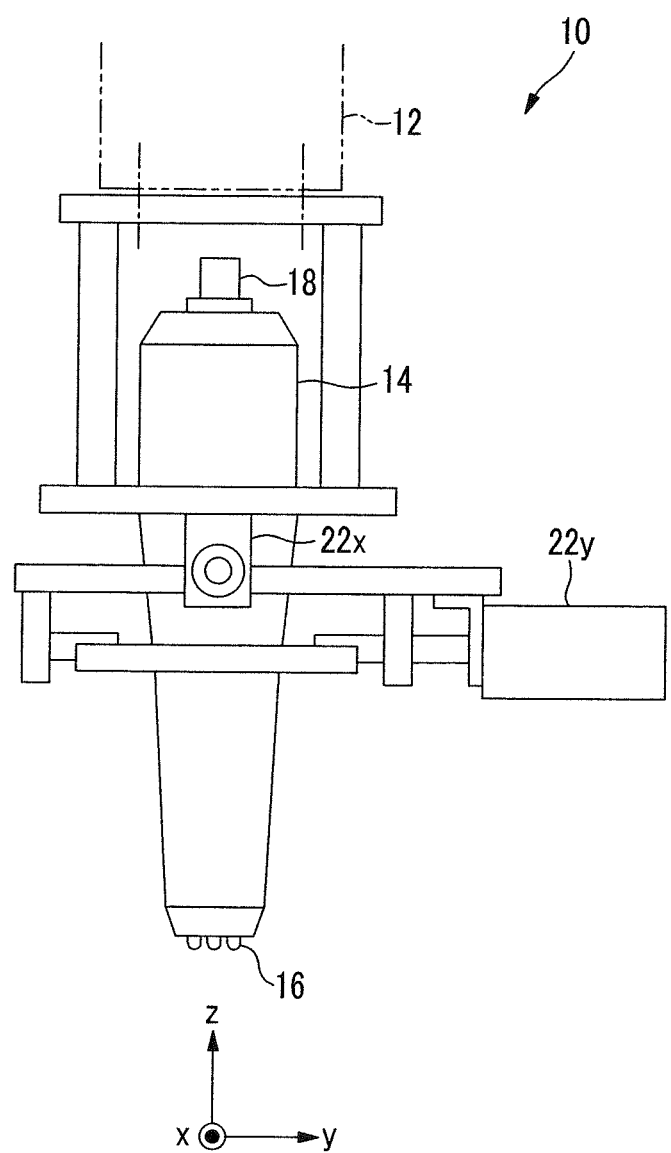
FIG. 11 is an outline view of the peening device according to the third embodiment of the present invention.

FIGS. 10 and 11 are outline views of the peening device 10 according to the third embodiment. In FIG. 10, a direction perpendicular to a paper surface is defined as a y axis, a right-left direction is defined as an x axis, and an up-down direction is defined as a z axis, and in FIG. 11, a direction perpendicular to a paper surface is defined as an x axis, a right-left direction is defined as a y axis, and an up-down direction is defined as a z axis.

Differently from the peening device 10 according to the first embodiment, in the peening device 10 according to the third embodiment, the laser displacement gauges 20A, 20B, 20C, and 20D are not provided. In addition, in FIGS. 10 and 11, the same reference numerals as those of FIGS. 1 and 2 are assigned to the same components as those of FIGS. 1 and 2, and the descriptions thereof are omitted.

Figure 12:
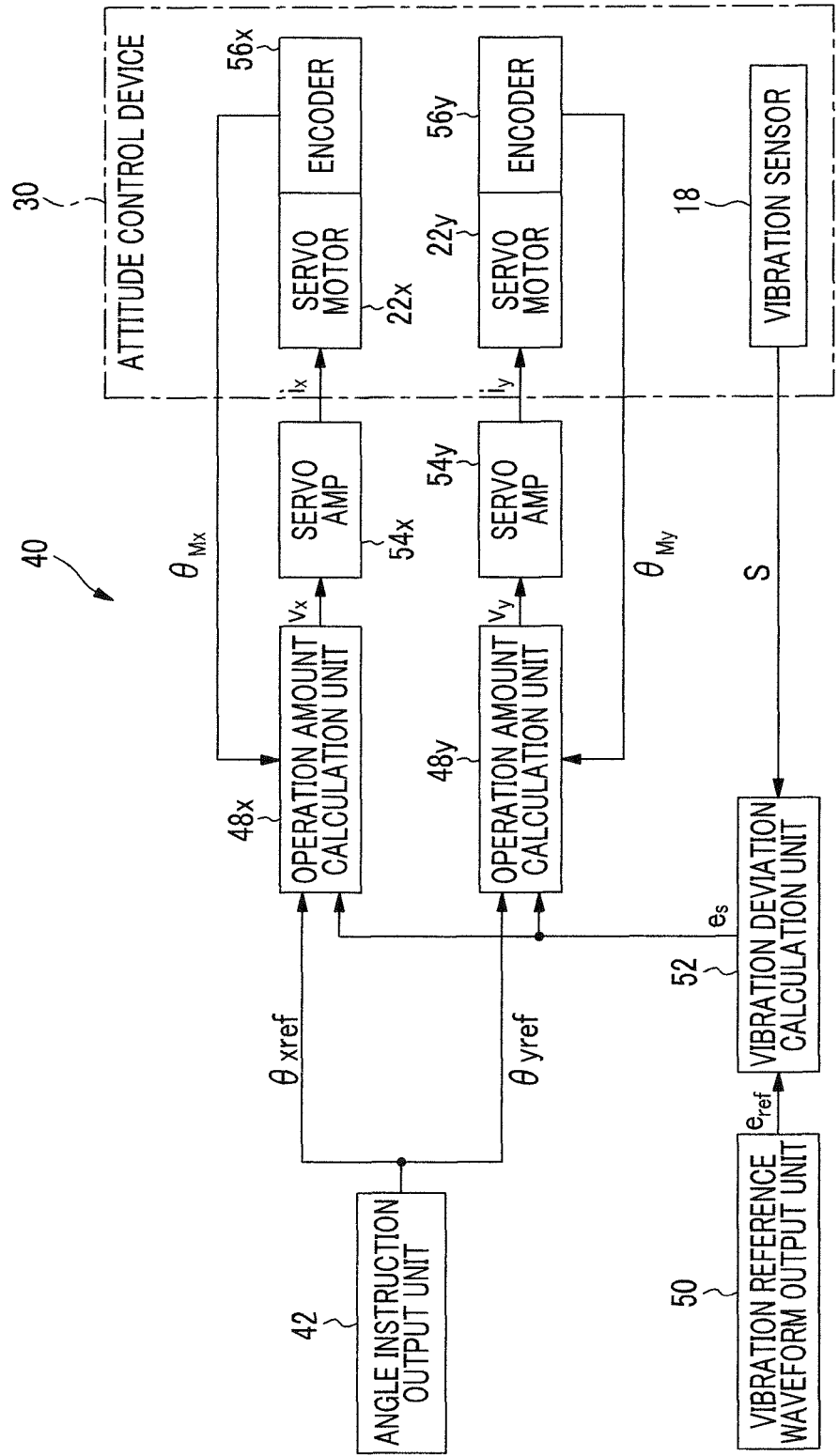
FIG. 12 is a block diagram showing an electrical configuration of a control device of the peening device according to the third embodiment of the present invention.

FIG. 12 is a block diagram showing an electrical configuration of the control device 40 of the peening device 10 according to the third embodiment, and particularly, shows the electronic configuration with respect to the attitude control. In addition, in FIG. 12, the same reference numerals as those of FIG. 3 are assigned to the same components as those of FIG. 3, and the descriptions thereof are omitted.

As shown in FIG. 12, the control device 40 according to the third embodiment performs the feedback based on the result detected by the vibration sensor 18, and calculates the operation amount command values $V_x$ and $V_y$.

In addition, the encoder 56x detects a rotation angle $\theta_{Mx}$ of the rotary shaft of the servo motor 22x, and outputs the rotation angle to the operation amount calculation unit 48x.

The operation amount calculation unit 48x calculates the device angle $\theta_x$ based on the rotation angle $\theta_{Mx}$, and calculates the angle deviation $e_{\theta x}$ in the x direction which is the deviation between the calculated device angle $\theta_x$ and the angle command value $\theta_{xref}$.

In addition, the operation amount calculation unit 48x calculates the operation amount command value $V_x$ indicating the operation amount with respect to the servo motor 22x based on the calculated angle deviation $e_{\theta x}$ in the x direction and the vibration deviation $e_x$, and outputs the operation amount command value to the servo amp 54x.

The encoder 56y detects a rotation angle $\theta_{My}$ of the rotary shaft of the servo motor 22y, and outputs the rotation angle to the operation amount calculation unit 48y.

The operation amount calculation unit 48y calculates the device angle $\theta_y$ based on the rotation angle $\theta_{My}$, and calculates the angle deviation $e_{\theta y}$ in the y direction which is the deviation between the calculated device angle $\theta_y$ and the angle command value $\theta_{yref}$.

In addition, the operation amount calculation unit 48y calculates the operation amount command value $V_y$ indicating the operation amount with respect to the servo motor 22y based on the calculated angle deviation $e_{\theta y}$ in the y direction and the vibration deviation $e_s$, and outputs the operation amount command value to the servo amp 54y.

In this way, the rotation angles $\theta_{Mx}$ and $\theta_{My}$ of the servo motors 22x and 22y and the vibration sensor signal S are fed back to the control device 40 of the third embodiment, and the control device 40 determines the operation amounts with respect to the servo motors 22x and 22y based on the differences between the device angles $\theta_x$ and $\theta_y$ calculated based on the rotation angles $\theta_{Mx}$ and $\theta_{My}$ and the angle command values $\theta_{xref}$ and $\theta_{yref}$, and the difference between the vibration sensor signal S and the reference waveform $e_{ref}$.

Figure 13:
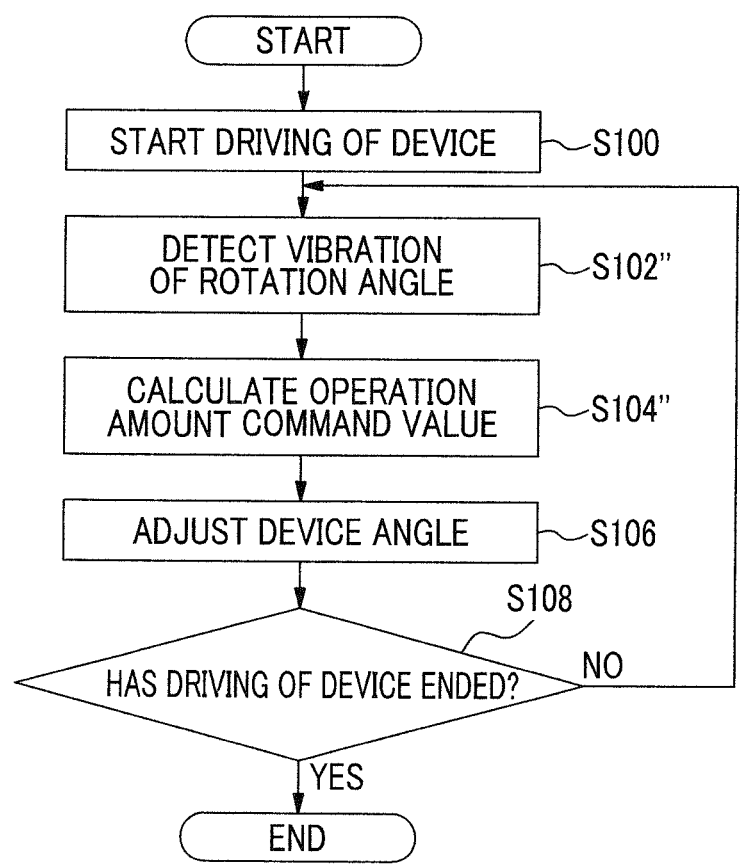
FIG. 13 is a flowchart showing a flow of peening processing according to the third embodiment of the present invention.

FIG. 13 is a flowchart showing a flow of peening processing according to the third embodiment. In addition, in FIG. 13, the same reference numerals as those of FIG. 5 are assigned to the same steps as those of FIG. 5, and a portion or the entirety of the descriptions thereof is omitted.

First, in Step 100, if the driving of the peening device 10 starts, processing or operation is transferred to Step 102".

In Step 102", the operation amount calculation units 48x and 48y calculate the device angles $\theta_x$ and $\theta_y$ based on the rotation angles $\theta_{Mx}$ and $\theta_{My}$ of the servo motors 22x and 22y, and the vibration sensor 18 detects the vibration of the device main body 14.

In the subsequent step 104", the operation amount calculation unit 48x calculates the operation amount command value $V_x$ using the feedback of the calculated device angles $\theta_x$ and $\theta_y$, and the detected vibration sensor signal S, the operation amount calculation unit 48y calculates the operation amount command value $V_y$, and processing or operation is transferred to Step 106.

In Step 106, the servo amp 54x supplies the current $I_x$ based on the operation amount command value $V_x$ to the servo motor 22x, and the servo amp 54y supplies the current $I_y$ based on the operation amount command value $V_y$ to the servo motor 22y.

In the subsequent step 108, it is determined whether or not stopping of the driving of the peening device 10 is instructed, when stopping is instructed, the peening processing ends, and when stopping is not instructed, processing or operation is transferred to Step S102", and thus, the peening with respect to the surface to be worked is continued.

As described above, the peening device 10 according to the third embodiment includes the peening impact pins 16 that impact on the surface to be worked, the device main body 14 that uses vibration to move the peening impact pins 16 back and forth with respect to the surface to be worked, the servo motors 22x and 22y that adjust the inclination of the device main body 14 with respect to the surface to be worked, and the vibration sensor 18 that detects the vibration state of the device main body 14. In addition, the control device 40 of the peening device 10 controls the servo motors 22x and 22y such that the vibration state detected by the vibration sensor 18 is a predetermined vibration state.

Accordingly, in the peening device 10 of the third embodiment, it is possible to carry out excellent peening by conforming to the surface to be worked, the shape of which changes from moment to moment because of the peening.

Moreover, in the third embodiment, the aspect in which the feedback is performed also using the device angles $\theta_x$ and $\theta_y$ based on the rotation angles $\theta_{Mx}$ and $\theta_{My}$ of the servo motors 22x and 22y is described. However, an aspect which feedbacks only the vibration state detected by the vibration sensor 18 without using the device angles $\theta_x$ and $\theta_y$ based on the rotation angles $\theta_{Mx}$ and $\theta_{My}$ may be used.

Fourth Embodiment

Hereinafter, a fourth embodiment of the present invention will be described.

The configuration of the peening device 10 according to the fourth embodiment is similar to the configuration of the peening device 10 according to the first embodiment shown in FIG. 1, and descriptions thereof are omitted.

Figure 14:
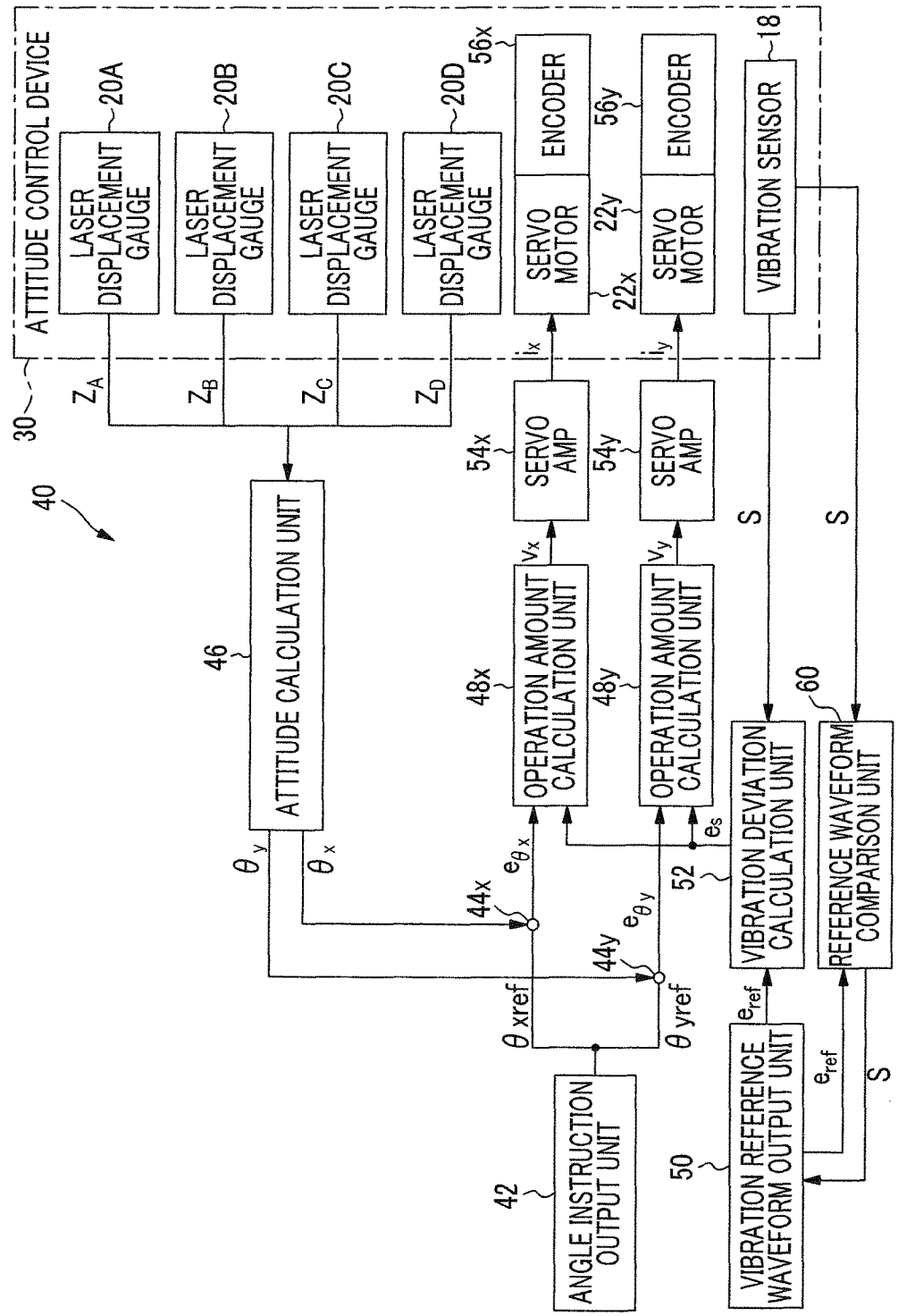
FIG. 14 is a block diagram showing an electrical configuration of a control device of a peening device according to a fourth embodiment of the present invention.

FIG. 14 is a block diagram showing the electrical configuration of the control device 40 of the peening device 10 according to the fourth embodiment, and particularly, shows the electrical configuration with respect to the attitude control. In addition, in FIG. 14, the same reference numerals as those of FIG. 3 are assigned to the same components as those of FIG. 3, and descriptions thereof are omitted.

As shown in FIG. 14, the control device 40 according to the fourth embodiment includes a reference waveform comparison unit 60. The reference waveform comparison unit 60 compares the reference waveform $e_{ref}$ stored in the vibration reference waveform output unit 50 and the vibration sensor signal S output from the vibration sensor 18. When the reference waveform $e_{ref}$ is larger than the vibration sensor signal S, the reference waveform $e_{ref}$ is updated to the detected vibration sensor signal S.

Thereafter, the control device 40 controls the servo motors 22x and 22y such that the vibration state detected by the vibration sensor 18 is the updated reference waveform $e_{ref}$.

Accordingly, in the peening device 10 according to the fourth embodiment, there can be a state with greater vibration, and thus, it is possible to perform a greater quantity of excellent peening.

As above, the present invention is described using the above-described embodiments. However, the technical scope of the present invention is not limited to the range of the descriptions of the embodiments. Various modifications and improvement can be applied to the above-described embodiments within a scope which does not depart from the gist of the present invention, and the aspects to which the modifications and the improvement are applied also are included to the technical scope of the present invention.

For example, in each embodiment, the aspect which includes the vibration sensor 18 detecting the acceleration of the device main body 14 as the vibration detection means detecting the vibration state of the device main body 14 is described. However, the present invention is not limited to this, there is a correlation between the vibration state of the device main body 14 and a sound generated by the peening, and thus, an aspect which uses a sound sensor (microphone) as the vibration detection means may be adopted. The sound sensor is not necessarily provided on the device main body 14, and may be provided in the vicinity of the surface to be worked.

Moreover, the flow of the peening processing described in each embodiment is an example, unnecessary steps may be removed within the scope which does not depart from the gist of the present invention, new steps may be added, and the processing order may be changed.

REFERENCE SIGNS LIST

10: peening device
16: peening impact pin
18: vibration sensor
20: laser displacement gauge
22x: servo motor
22y: servo motor
40: control device

The invention claimed is:

1. A peening device comprising:
   an impact unit that impacts on a surface to be worked;
   a device main body that uses vibration to move the impact unit back and forth with respect to the surface to be worked;
   an inclination adjustment unit that adjusts an inclination of the device main body with respect to the surface to be worked;
   an angle detection unit that detects an angle between the device main body and the surface to be worked; and
   a vibration detection unit that detects a vibration state of the device main body; and
   a control unit that controls the inclination adjustment unit, wherein the control unit determines an operation amount with respect to the inclination adjustment unit based on a difference between the angle detected by the angle detection unit and a predetermined angle and a difference between the vibration state detected by the vibration detection unit and a predetermined vibration state, and controls the inclination adjustment unit based on a determined operation amount.

2. The peening device according to claim 1, wherein the inclination adjustment unit is a motor that rotates the device main body around a predetermined axis.

3. The peening device according to claim 2, wherein the angle detection unit calculates the angle between the device main body and the surface to be worked based on a rotation speed of the motor.

4. The peening device according to claim 2, wherein the angle detection unit detects a distance between the device main body and the surface to be worked at a plurality of locations, and detects the angle between the device main body and the surface to be worked.

5. The peening device according to claim 1, wherein when the vibration in the vibration state detected by the vibration detection unit is greater than that in the predetermined vibration state, the predetermined vibration state is updated to a detected vibration state.

6. A peening method comprising:
   a step of providing a peening device which includes an impact unit that impacts on a surface to be worked, a device main body that moves the impact unit back and forth with respect to the surface to be worked, and an inclination adjustment unit that adjusts an inclination of the device main body with respect to the surface to be worked;
   a step of detecting an angle between the device main body and the surface to be worked;
   a step of detecting a vibration state of the device main body;
   a step of determining an operation amount with respect to the inclination adjustment unit based on a difference between the angle detected by the angle detection unit and a predetermined angle and a difference between the vibration state detected by the vibration detection unit and a predetermined vibration state; and
   a step of controlling the inclination adjustment unit based on a determined operation amount.

\* \* \* \* \*